March 11, 1952     E. P. COOK     2,588,701

DISK GANG ADJUSTING MECHANISM

Filed July 22, 1946     2 SHEETS—SHEET 1

INVENTOR.
*Einar P. Cook*

March 11, 1952 E. P. COOK 2,588,701
DISK GANG ADJUSTING MECHANISM
Filed July 22, 1946 2 SHEETS—SHEET 2

INVENTOR.
Einar P. Cook
BY
ATTYS

Patented Mar. 11, 1952

2,588,701

UNITED STATES PATENT OFFICE 2,588,701

DISK GANG ADJUSTING MECHANISM

Einar P. Cook, Clovis, Calif.

Application July 22, 1946, Serial No. 685,315

2 Claims. (Cl. 55—81)

This invention relates in general to improvements in tractor drawn, tandem disc gang harrows of the type wherein the gangs are mounted for adjustment between a parallel transport or non-working position, and an angled working position.

One object of the invention is to provide a novel mechanism for adjusting the disc gangs between the above positions; said mechanism including and being actuated through the medium of the hitch which couples the implement to the tractor.

A further object of the invention is to provide a mechanism, as in the preceding paragraph, comprising a transverse drawbar disposed ahead of the front gang and connected thereto for relative swinging motion in a horizontal plane, a draft tongue secured to and projecting forwardly from the drawbar, and motion transmitting means between the drawbar and the rear gang operative to shift the gangs to transport or working position upon relative swinging motion of the drawbar in one direction or the other, respectively.

An additional object is to provide an effective, yet simple, latching device between the gangs to maintain the same in the respective positions of adjustment thereof.

A further object of the invention is to produce a practical device and one which will be exceedingly effective for the purpose for which it is designed.

These objects are accomplished by means of such structure and relative arrangement of parts as will fully appear by a perusal of the following specification and claims.

In the drawings:

Figure 4 is an enlarged fragmentary sectional elevation of the latching device.

Figure 1:
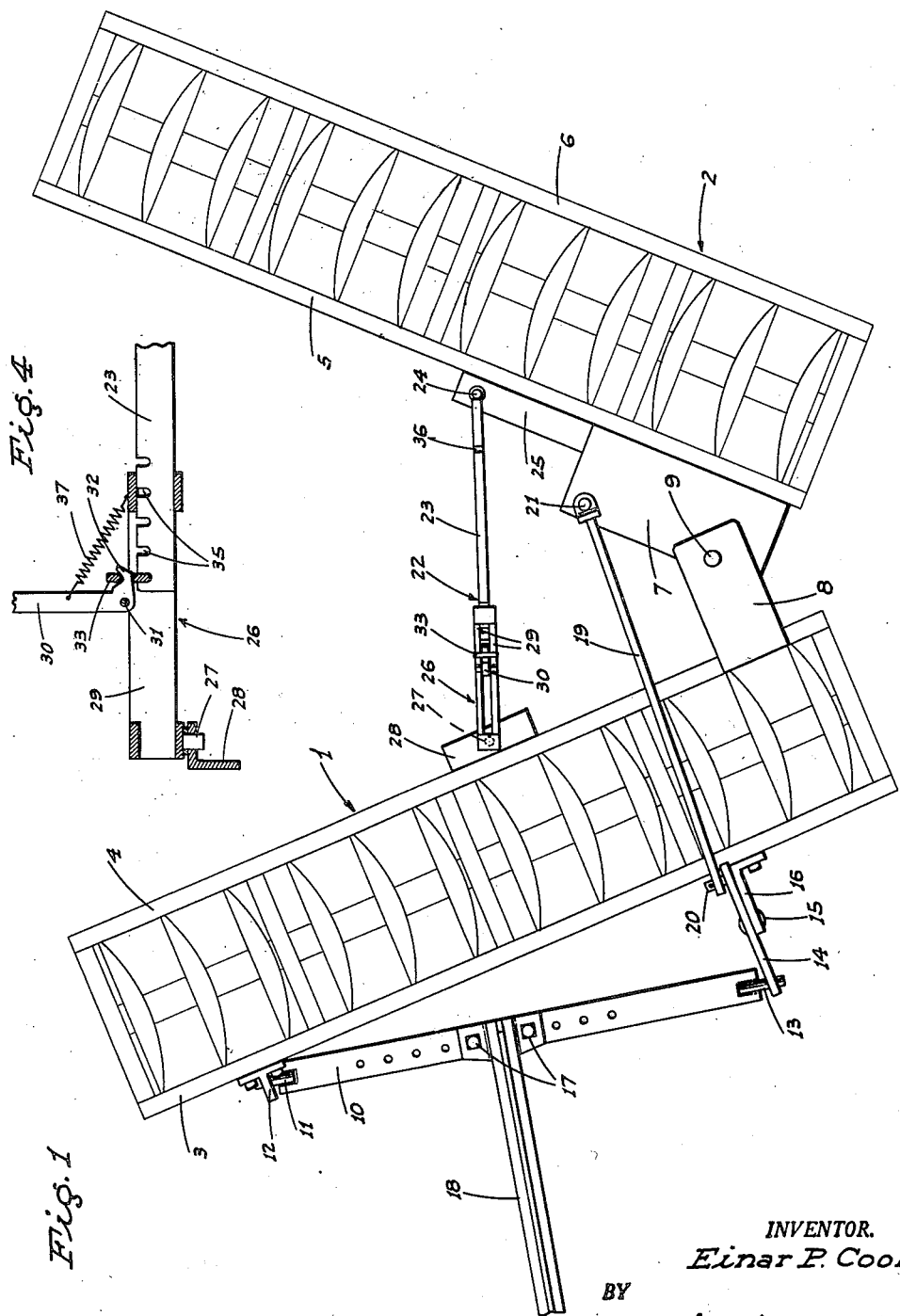
Figure 1 is a plan view of a tandem disc gang harrow embodying the present invention; the gangs being shown in angled or working position.

Referring now more particularly to the characters of reference on the drawings, the invention is here shown as embodied in connection with a tandem disc gang harrow which includes front and rear gangs indicated generally at 1 and 2, respectively. The front gang 1 includes a front beam 3 and a parallel rear beam 4, while the rear gang 2 includes a front beam 5 and a rear beam 6.

Figure 2:
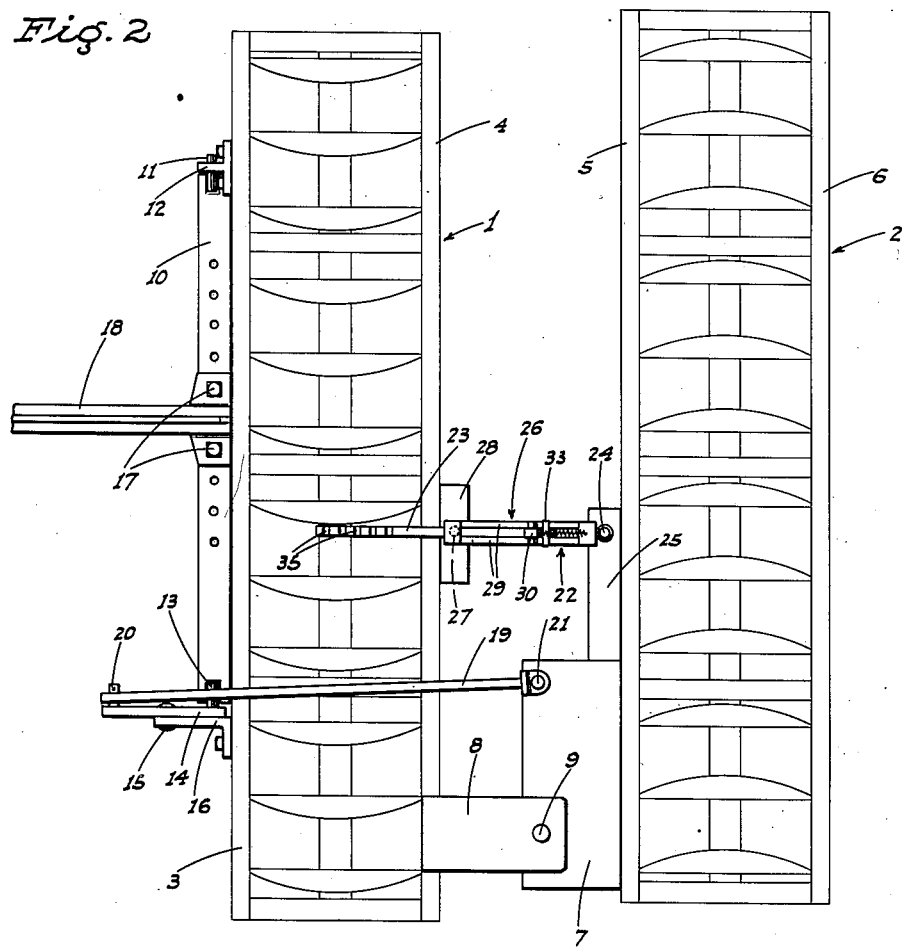
Figure 2 is a similar view but shows the gangs in parallel or transport position.

The disc gangs 1 and 2 are pivotally connected together adjacent one end for relative swinging movement in a horizontal plane between a divergent or angled working position as in Fig. 1, and a parallel or transport position as in Fig. 2. The pivotal mount between the front and rear gangs comprises a plate 7, fixed on the front beam 5 of the rear gang 2 and projecting forwardly, and a pair of plates 8 which extend rearwardly from the rear beam 4 of the front gang 1. The plates 7 and 8 are coupled together by a vertical pivot pin 9.

A horizontal drawbar 10 is disposed ahead of the front beam 3 of the front gang 1 substantially symmetrically of the ends of the latter; said drawbar 10 being connected at one end by a loose play pivot 11 with a bracket 12 on the front beam 3 adjacent one end of the front gang 1. At its opposite end the drawbar 10 is connected by a loose play pivot 13 with the lower end of a swing lever 14 pivoted, as at 15, on another bracket 16 secured to the front beam 3 adjacent the opposite end of the front gang 1. As so mounted, the lever 14 is swingable in a plane extending generally lengthwise of the implement.

Intermediate its ends the drawbar 10 is rigidly, but adjustably, connected, as at 17, with the rear end of a forwardly projecting draft tongue 18 which is adapted to couple to a tractor (not shown).

A rigid, generally longitudinally extending link 19 is connected at its forward end by a loose play pivot 20 with the upper end of the swing lever 14. At its rear end the link 19 is connected by loose play pivot 21 with the plate 7 some distance laterally inwardly of the pivot pin 9.

When the implement is in its angled or working position, as in Fig. 1, the drawbar 10 and the front beam 3 diverge laterally from the pivot 11 in the direction of the swing lever 14, the latter then being disposed with its lower end foremost, i. e., the lever being disposed at an upward and rearward incline from said lowered end. The gangs are maintained in their transport or working positions by a releasable and adjustable latching device which connects therebetween laterally inwardly of the pivot 21; said latching device being indicated generally at 22, and is hereinafter described in detail.

Figure 3:
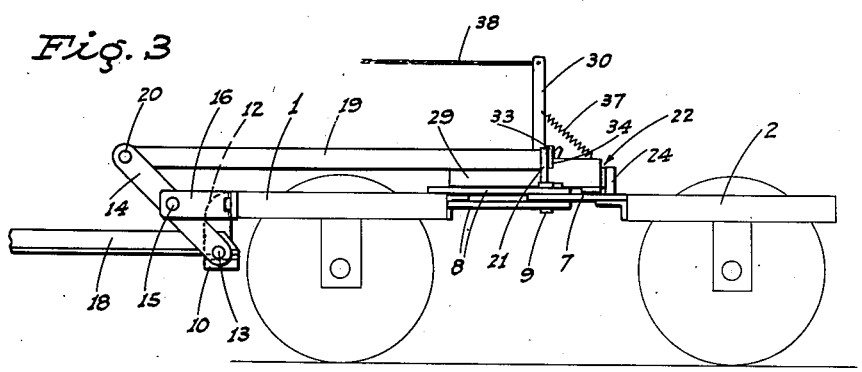
Figure 3 is an end view of the harrow with the gangs in the position shown in Fig. 2.

When the operator of the tractor desires to shift the front and rear gangs 1 and 2, respectively, to the parallel or transport position of Fig. 2, the implement is manipulated as follows:

First, the tractor is stopped and then reversed causing the drawbar 10 to be swung toward and into substantial parallelism with the front beam 3 of the front gang 1. When this occurs the swing lever 14 is swung to a forwardly and upwardly inclined position from its lowered end, as clearly shown in Fig. 3, which relatively pulls forwardly on the link 19 causing the angled gangs to move into the parallel relationship of Fig. 2. The latching device 22 is, of course, released before the disc gangs are adjusted in the manner above described.

To again angle the disc gangs to their working position, the tractor operator merely reverses the above described procedure.

The releasable and adjustable device 22 comprises the following structural arrangement:

A slide bar 23 is pivoted at its rear end, as at 24, to a bracket 25 on the front beam 5 of the rear gang 2, and thence extends forwardly, in slidable relation, into a rearwardly extending guide unit 26. The guide unit 26 is pivoted at its forward end, as at 27, to a bracket 28 on the rear beam 4 of the front gang 1. The guide unit 26 includes a pair of transversely spaced longitudinally extending side members 29 between which the slide bar 23 is engaged. A lever 30 is pivotally mounted at its lower end, as at 31, in connection with the guide unit 26 between the side members 29; said lever having a rearwardly projecting hook 32 on its lower end, which hook carries a transverse locking dog 33. The transverse locking dog 33 normally seats in alined upwardly opening notches 34 in the side members 29, and simultaneously seats in one of a row of upwardly opening notches 35 in the slide bar 23 adjacent the forward end of the latter, or in a single upwardly opening notch 36 in the slide bar 23 adjacent its rear end.

A spring 37 normally urges the lever 30 rearwardly, and the locking dog 33 to working position. A pull cord 38 leads forwardly from the upper end of the lever 30 to adjacent the operator's seat on the tractor, whereby the operator may release the locking dog 33 by a pull on said cord.

When the gangs are in their angled or working position, the locking dog 33 seats in the notches 34 as well as in one of the notches 35, depending on the angle of the gangs. When the gangs are in their parallel or transport position of Fig. 2 the locking dog 33 seats in the notches 34 and the single notch 36 in the slide bar 23 adjacent its rear end. The described latching device provides a simple and yet rugged arrangement for maintaining the gangs in their respective positions of adjustment.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. Disc gang adjusting mechanism for a tandem disc gang harrow which includes front and rear gangs pivoted adjacent one end thereof for movement between a parallel transport position and an angled working position; said mechanism comprising a transverse drawbar disposed ahead of the front gang, a draft tongue secured to the drawbar intermediate its end and projecting forwardly, means pivoting the drawbar at one end to the front gang for relative swinging motion in a horizontal plane, and motion transmitting means between the opposite end of the drawbar and the rear gang operative to shift the gangs to transport or working position upon relative swinging motion of the draw bar in one direction or the other, respectively; said motion transmitting means comprising a vertically up-standing swing lever disposed adjacent said opposite end of the draw bar, means pivoting the swing lever intermediate its ends in connection with the front gang for swinging motion in a plane generally lengthwise of the implement, means pivotally connecting said opposite end of the draw bar with one end of the swing lever, and a link pivotally connected between the other end of the swing lever and the rear gang laterally inwardly of the pivot of said gangs; the drawbar being connected to the lower end of the link to the upper end of the swing lever, the latter inclining upwardly and forwardly from its lower end when the gangs are in parallel transport position, and inclining upwardly and rearwardly when the gangs are in angled working position, the drawbar then diverging relative to the front gang in the direction of said lever.

2. Gang adjusting mechanism for a tandem disc gang harrow which includes front and rear gangs pivoted together adjacent one end for movement between a parallel transport position and an angled working position; said mechanism comprising a transverse drawbar pivoted at one end on the front gang for relative swinging motion in a horizontal plane, a draft tongue projecting forwardly from the drawbar, an upstanding swing lever pivoted intermediate its ends on the front gang adjacent the other end of the drawbar for swinging movement in a plane generally lengthwise of the implement, and disposed with a forward slope to its lower end when the drawbar is in a forwardly swung position, a link connecting the upper end of the lever and the rear gang at a point on the latter inwardly offset laterally from the gang pivot, and a laterally projecting pin on the drawbar at said other end thereof and engaging in the lower end of the lever.

EINAR P. COOK.

REFERENCES CITED

The following references are of record in the file of this patent:

UNITED STATES PATENTS

| Number | Name | Date |
| --- | --- | --- |
| Re. 19,598 | Furrer | June 4, 1935 |
| Re. 20,967 | Rapp et al. | Jan. 3, 1939 |
| 831,789 | King | Sept. 25, 1906 |
| 1,336,676 | Cady | Apr. 13, 1920 |
| 1,627,355 | Towner | May 3, 1927 |
| 2,237,009 | Mitchell | Apr. 1, 1941 |
| 2,237,884 | Lysedahl | Apr. 8, 1941 |
| 2,303,320 | Benjamin et al. | Dec. 1, 1942 |